UNITED STATES PATENT OFFICE.

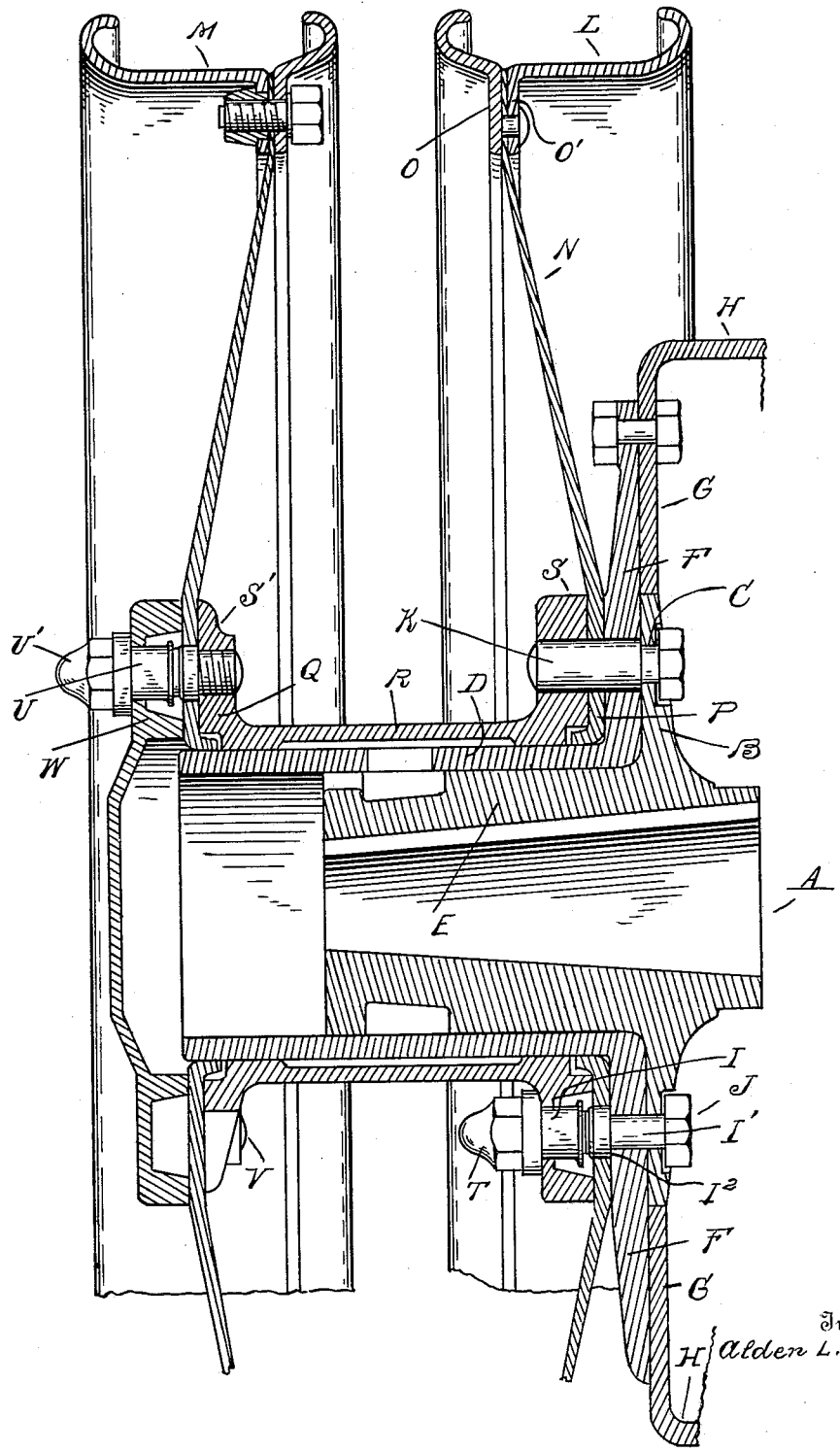

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

CONVERTIBLE DUAL-WHEEL CONSTRUCTION.

1,297,243.   Specification of Letters Patent.   Patented Mar. 11, 1919.

Application filed February 28, 1918. Serial No. 219,564.

*To all whom it may concern:*

Be it known that I, ALDEN L. PUTNAM, a citizen of the United States of America, residing at Detroit, in the county of Wayne and State of Michigan, have invented certain new and useful Improvements in Convertible Dual-Wheel Constructions, of which the following is a specification, reference being had therein to the accompanying drawings.

The invention relates to wheels of the type designed for use on trucks and other heavy-load-carrying vehicles, and it is the object of the invention to provide means for converting a standard construction of wheel hub into a mounting for a dual wheel. To this end the invention comprises the construction as hereinafter set forth.

In the drawings:

The figure is an axial section through the wheel hub showing the dual wheel mounting attached thereto.

A is a wheel hub of any standard construction designed for use in connection with wooden spoke wheels, and B is a radially-extending annular flange integral with the hub, having a series of apertures C therein designed for the passage of the spoke clamping bolts.

My attachment comprises a sleeve member D adapted to fit over the portion E of the hub, which normally engages the ends of the wooden spokes, said sleeve extending beyond the outer end of the hub and being provided at its inner end with a radially-extending annular flange F. This flange lies adjacent to the flange B of the hub but extends beyond the same to form a mounting for an inwardly-extending flange G of the brake-drum H. I are shoulder studs, the shanks I' of which pass through the apertures C and registering apertures in the flange F, while the shoulder $I^2$ bears against the outer face of said flange F and is clamped thereagainst by a nut J engaging the threaded end of the shank and bearing against the inner face of the flange B. The studs I are arranged only in alternate apertures of the series C and intermediate these studs are arranged shoulder pins K of greater diameter, the shoulders of which bear directly against the flange B.

The dual wheel comprises two similar wheel members L and M, each consisting of a dished disk center N and rim sections O and O' detachably clamped thereto. The dished disks are preferably of tapering cross-section, being of heavy gage at the center and light gage at the periphery. Also the central and peripheral portions are preferably parallel to the plane of rotation and at an angle to the intermediate dished portion. The inner portion P of the disk is apertured to register with the studs I and pins K, and it is also preferably provided with a flange Q at its inner edge for fitting and forming a bearing upon the member D.

To secure the wheel members L and M to the hub they are sleeved upon the member D and a flanged spacer member R is arranged therebetween. This member R has at its inner end the flange S forming a clamping ring for engaging the portion P of the inner disk and being secured thereto by clamping nuts T engaging the threaded studs I. The outer flange S' of the member R is provided with a series of studs and pins U and V, similar to the studs and pins I and K and correspondingly engaging the outer disk member. W is a clamping ring for the outer disk member engaging the studs and pins U and V and secured by nuts U'.

In use, a single wheel may be converted into a dual wheel by removing the spoked wheel from the hub, disengaging the brake band therefrom and placing the member D on the hub. The brake-drum is then attached to the outer portion of the flange F and this flange secured by the clamping of the same with the shoulder studs I. The disk wheel L is then placed in position and clamped by the member R, after which the outer disk wheel M is mounted and clamped by the member W. The two disks are preferably arranged oppositely, their hub portions being spaced farther apart than the peripheral portions and the rims are oppositely offset by making the sections O and O' of different widths and inwardly flanging the same to embrace the opposite sides of the disk. This makes a compact construction and one which may be readily mounted and demounted.

What I claim as my invention is:

1. The combination with a hub for a single wheel having a radially-extending flange, of a sleeve member attachable to said hub and projecting beyond the same, the inner end of said sleeve having a radially-extending annular flange lying adjacent to the flange of the hub, a pair of disk wheel members engageable with said sleeve, a spacer-sleeve intermediate said disks having radially-extending flanges at its opposite ends, clamping means for securing the inner flange to the flanges of said hub and sleeve, and clamping means for securing the outer disk.

2. The combination with a hub member for a single wheel having a radially-extending annular flange, of a sleeve member attachable to said hub and projecting beyond the same, said sleeve member having a radial annular flange lying adjacent to the flange on said hub and projecting beyond the same, a brake-drum having an inwardly-extending flange secured to the projecting portion of the flange on said sleeve and in the plane of the flange on said hub, a pair of disk wheels engageable with said sleeve at opposite ends thereof, a spacer sleeve engageable with said first-mentioned sleeve and having flanges at its opposite ends adjacent to said disk wheels, a series of coöperating studs and nuts for clamping the inner flange of said spacer sleeve to the flange of the hub to secure the inner disk wheel, a clamping member for the outer disk wheel forming a cap for the end of said hub and sleeve, and a series of coöperating studs and nuts for securing said clamping member to the outer flange of said spacer sleeve.

3. The combination with a hub member for a single wood-spoke wheel having an integral radially-extending annular spoke-clamping flange, of a sleeve for engaging the outer cylindrical surface of said hub and projecting beyond the same, the inner end of said sleeve having a radially extending annular flange of greater width than the flange of said hub, a brake-drum having an inwardly-extending flange secured to the projecting portion of the flange of said sleeve and lying in the plane of the flange of said hub, a series of studs secured to the hub flange projecting through registering apertures in the sleeve flange, a disk wheel fitting said sleeve, lying adjacent to the sleeve flange and apertured for engagement with said studs, a spacer sleeve member having a flange at its inner end for engagement with said studs and a flange at its outer end forming a seat for an outer disk wheel, a series of studs projecting outward from said outer flange, a wheel disk apertured for engagement with said studs, a cap and clamping member also engageable with said studs, and coöperating nut members for the studs of the inner and the outer flanges to clamp said wheel disks to the hub.

4. The combination with a hub for a single wheel having a radially-extending flange, of a sleeve member attachable to said hub and projecting beyond the same, the inner end of said sleeve having a radially-extending annular flange lying adjacent to the flange of the hub, a disk wheel member engaged with said sleeve adjacent said flange thereof, clamping means for securing the flanges of the hub and sleeve to each other and to said disk member, and a second disk member mounted upon the outer end of said sleeve.

5. The combination with a hub member for a single wheel having a radially-extending annular flange, of a sleeve member attachable to said hub and projecting beyond the same, said sleeve member having a radial annular flange lying adjacent to the flange on said hub and projecting beyond the same, a brake-drum having an inwardly-extending flange secured to the projecting portion of the flange on said sleeve and in the plane of the flange on said hub, a disk wheel engaged with the inner end of said sleeve, clamping means for securing said wheel to the flanges of said sleeve and hub, and a second disk wheel mounted upon the outer end of said sleeve.

6. The combination with a hub member for a single wheel having a radially-extending annular flange, of a sleeve member attachable to said hub and projecting beyond the same, said sleeve member having a radial annular flange lying adjacent to the flange on said hub and projecting beyond the same, a brake-drum having an inwardly-extending flange secured to the projecting portion of the flange on said sleeve and in the plane of the flange on said hub, a disk wheel engaged with the inner end of said sleeve, means clamping said wheel to the flanges of said sleeve and hub, a second disk wheel mounted upon the outer end of said sleeve, and a clamping member for the second disk wheel forming a cap for the end of said hub and sleeve.

7. The combination with a hub member for a single wheel having a radially-extending annular flange, of a sleeve member attachable to said hub and projecting beyond the same, the inner end of said sleeve having a radially-extending annular flange lying adjacent to the flange of the hub and projecting beyond the same, a pair of disk wheels engageable with said sleeve at opposite ends thereof, a spacer sleeve engageable with said first-mentioned sleeve and having flanges at its opposite ends adjacent to said disk wheels, means for clamping the inner flange of said spacer sleeve to the flange of the hub to secure the inner disk wheel, a clamping member for the outer disk wheel forming a cap for the end of said hub and sleeve, and means for securing said clamping member to the outer flange of said spacer sleeve.

In testimony whereof I affix my signature.

ALDEN L. PUTNAM.